US012111411B1

United States Patent
Temil et al.

(10) Patent No.: US 12,111,411 B1
(45) Date of Patent: Oct. 8, 2024

(54) AUTOMATED GENERATION OF RADAR INTERFERENCE REDUCTION TRAINING DATA FOR AUTONOMOUS VEHICLE SYSTEMS

(71) Applicant: Waymo LLC, Mountain View, CA (US)

(72) Inventors: Alessandro Temil, Mountain View, CA (US); Gary Clayton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 552 days.

(21) Appl. No.: 17/367,888

(22) Filed: Jul. 6, 2021

(51) Int. Cl.
*G01S 7/02* (2006.01)
*G01S 7/40* (2006.01)
(Continued)

(52) U.S. Cl.
CPC ............... *G01S 7/023* (2013.01); *G01S 7/40* (2013.01); *G01S 7/4021* (2013.01); *G06N 5/04* (2013.01); *G06N 20/00* (2019.01)

(58) Field of Classification Search
CPC .......... G01S 7/023; G01S 7/40; G01S 7/4021; G06N 20/00; G06N 5/04
See application file for complete search history.

(56) References Cited

U.S. PATENT DOCUMENTS 6,271,786 B1 * 8/2001 Huff .................. G01S 13/346
342/16
8,860,602 B2 10/2014 Nohara et al.
(Continued)

FOREIGN PATENT DOCUMENTS

CN 101915921 A 12/2010
CN 108090412 A 5/2018
(Continued)

OTHER PUBLICATIONS

Sun et al. "MIMO Radar for Advanced Driver-Assistance Systems and Autonomous Driving," IEEE Signal Processing Magazine (vol. 37, Issue: 4, Jul. 2020), Digital Object Identifier 10.1109/MSP.2020.2978507, Date of current version: Jun. 26, 2020, pp. 1-20 (Year: 2020).*

(Continued)

*Primary Examiner* — James R Hulka
*Assistant Examiner* — Samarina Makhdoom
(74) *Attorney, Agent, or Firm* — McDonnell Boehnen Hulbert & Berghoff LLP

(57) ABSTRACT

Example embodiments relate to methods and systems for automated generation of radar interference reduction training data for autonomous vehicles. In an example, a computing device causes a radar unit to transmit radar signals in an environment of a vehicle. The computing device may include a model trained based on a labeled interferer dataset that represents interferer signals generated by an emitter located remote from the vehicle. The interferer signals are based on one or more radar signal parameter models. The computing device may use the model to determine whether received electromagnetic energy corresponds to transmitted radar signals or an interferer signal. Based on determining that the electromagnetic energy corresponds to the transmitted radar signals, the computing device may generate a representation of the environment of the vehicle using the electromagnetic energy.

19 Claims, 11 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 9,229,102 B1* | 1/2016 | Wright | G01S 13/885 |
| 9,384,402 B1 | 7/2016 | Furman et al. | |
| 9,547,989 B2 | 1/2017 | Fairfield et al. | |
| 9,866,422 B1 | 1/2018 | Ray | |
| 9,991,908 B2 | 6/2018 | Ray | |
| 10,725,151 B1 | 7/2020 | Ray | |
| 10,791,436 B2 | 9/2020 | Way et al. | |
| 10,802,110 B2 | 10/2020 | Va et al. | |
| 10,809,353 B2 | 10/2020 | Subburaj et al. | |
| 10,819,923 B1 | 10/2020 | McCauley et al. | |
| 2008/0240410 A1* | 10/2008 | Dapper | H04N 21/2383 379/362 |
| 2015/0155899 A1* | 6/2015 | Webb | H04B 1/525 455/303 |
| 2018/0011180 A1* | 1/2018 | Warnick | G01S 13/06 |
| 2018/0081354 A1* | 3/2018 | Magy | H04L 67/12 |
| 2018/0262283 A1* | 9/2018 | Guarin Aristizabal | H04B 17/345 |
| 2019/0101634 A1* | 4/2019 | Baheti | G01S 7/415 |
| 2020/0278419 A1* | 9/2020 | Borosak | G01S 13/34 |
| 2020/0284874 A1* | 9/2020 | Narayana Moorthy | G01S 13/343 |
| 2020/0284883 A1* | 9/2020 | Ferreira | G01S 7/4811 |
| 2020/0292660 A1* | 9/2020 | Meissner | G01S 7/354 |
| 2021/0190902 A1* | 6/2021 | Amihood | G01S 7/358 |

FOREIGN PATENT DOCUMENTS

| | | | | |
|---|---|---|---|---|
| CN | 109884603 A | | 6/2019 | |
| CN | 112651181 A | * | 4/2021 | G06F 30/27 |
| KR | 102137825 B1 | * | 7/2020 | G01S 13/931 |

OTHER PUBLICATIONS

Kim et al. "Classification of Interference Signal for Automotive Radar Systems With Convolutional Neural Network," IEEE Access vol. 8, Oct. 7, 2020 (Year: 2020).*

Sujeet Milind Patole et al., "Automotive radars: a review of signal processing techniques", IEEE Signal Processing Magazine, vol. 34, No. 2, pp. 22-35, Mar. 3, 2017.

Davidson et al., "Understanding Digital Radio Frequency Memory Performance in Countermeasure Design", Applied Sciences, 2020, 10, 4123, 18 pages.

* cited by examiner

AUTOMATED GENERATION OF RADAR INTERFERENCE REDUCTION TRAINING DATA FOR AUTONOMOUS VEHICLE SYSTEMS

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for efficiently and autonomously generating large labeled reference datasets that accurately simulate a large diversity of potential interferer signals that a vehicle radar system can encounter during operation. Example embodiments use the resulting labeled reference datasets and/or models generated based on the labeled datasets to detect and distinguish desired radar reflection signals from the interferer signals produced by other emitters (e.g., other vehicles) in the area.

In one aspect, an example method is provided. The method involves causing, by a computing device, a radar unit to transmit radar signals in an environment of a vehicle, where the radar unit is coupled to the vehicle, where the computing device comprises a model trained based on a labeled interferer dataset that represents a plurality of interferer signals generated by an emitter located remote from the vehicle, and where the plurality of interferer signals are based on one or more radar signal parameter models. The method also involves receiving, at the computing device and from the radar unit, electromagnetic energy from the environment. The method also involves determining whether the received electromagnetic energy corresponds to the transmitted radar signals or an interferer signal based on the model. The method also involves generating a representation of the environment using the electromagnetic energy based on determining that the electromagnetic energy corresponds to the transmitted radar signals.

In another aspect, an example system is provided. The system includes a computing device. The computing device includes at least one processor and at least one memory. The at least one processor is configured to execute program instructions stored in the at least one memory so as to carry out operations. The operations include causing a radar unit to transmit radar signals in an environment of a vehicle, where the radar unit is coupled to the vehicle, where the computing device comprises a model trained based on a labeled interferer dataset that represents a plurality of interferer signals generated by an emitter located remote from the vehicle, and where the plurality of interferer signals are based on one or more radar signal parameter models. The operations also include receiving, from the radar unit, electromagnetic energy from the environment. The operations also include determining whether the received electromagnetic energy corresponds to the transmitted radar signals or an interferer signal based on the model. The operations also include generating a representation of the environment using the electromagnetic energy based on determining that the electromagnetic energy corresponds to the transmitted radar signals.

In another example, an example vehicle system is provided. The vehicle system includes a receiver configured to receive radio frequency signals from an environment of a vehicle. The vehicle system also includes a computing device, coupled to the receiver, configured to determine whether a radio frequency signal received by the receiver is one of: a reflection of a radar signal transmitted from a radar unit of the vehicle or a radio frequency signal from an emitter in the environment of the vehicle, based on a model trained on a labeled interferer dataset generated using one or more DRFM devices remote from the vehicle.

In yet another aspect, an example method is provided. The method involves determining, by a computing device, a set of parameter values that collectively define a simulated interferer signal. The method also involves controlling, by the computing device, an external emitter coupled to the computing device to generate and transmit the simulated interferer signal based on the determined set of parameter values. The method also involves receiving, at the computing device, the simulated interferer signal from a receiver of a radar system. The method also involves removing, by the computing device, at least one spurious artifact from the received simulated interferer signal, wherein the at least one spurious artifact is caused by the transmission of the simulated interferer signal. The method also involves in response to removing the at least one spurious artifact, generating, by the computing device, an interferer dataset including the simulated interferer signal.

In yet another aspect, an example system is provided. The system includes a computing device. The computing device includes at least one processor and at least one memory. The at least one processor is configured to execute program instructions stored in the at least one memory so as to carry out operations. The operations include determining a set of parameter values that collectively define a simulated interferer signal. The operations also include controlling an external emitter coupled to the computing device to generate and transmit the simulated interferer signal based on the determined set of parameter values. The operations also include receiving the simulated interferer signal from a receiver of a radar system. The operations also include removing at least one spurious artifact from the received simulated interferer signal, wherein the at least one spurious artifact is caused by the transmission of the simulated interferer signal. The operations also include in response to removing the at least one spurious artifact, generating an interferer dataset including the simulated interferer signal.

In yet another example, an example non-transitory computer readable medium having stored therein program instructions executable by a computing device to cause the computing device to perform operations is provided. The operations include determining a set of parameter values that collectively define a simulated interferer signal. The operations also include controlling an external emitter coupled to the computing device to generate and transmit the simulated interferer signal based on the determined set of parameter values. The operations also include receiving, at the computing device, the simulated interferer signal from a receiver of a radar system. The operations also include removing at least one spurious artifact from the received simulated interferer signal, wherein the at least one spurious artifact is caused by the transmission of the simulated interferer signal. The operations also include in response to removing the at least one spurious artifact, generating an interferer dataset including the simulated interferer signal.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
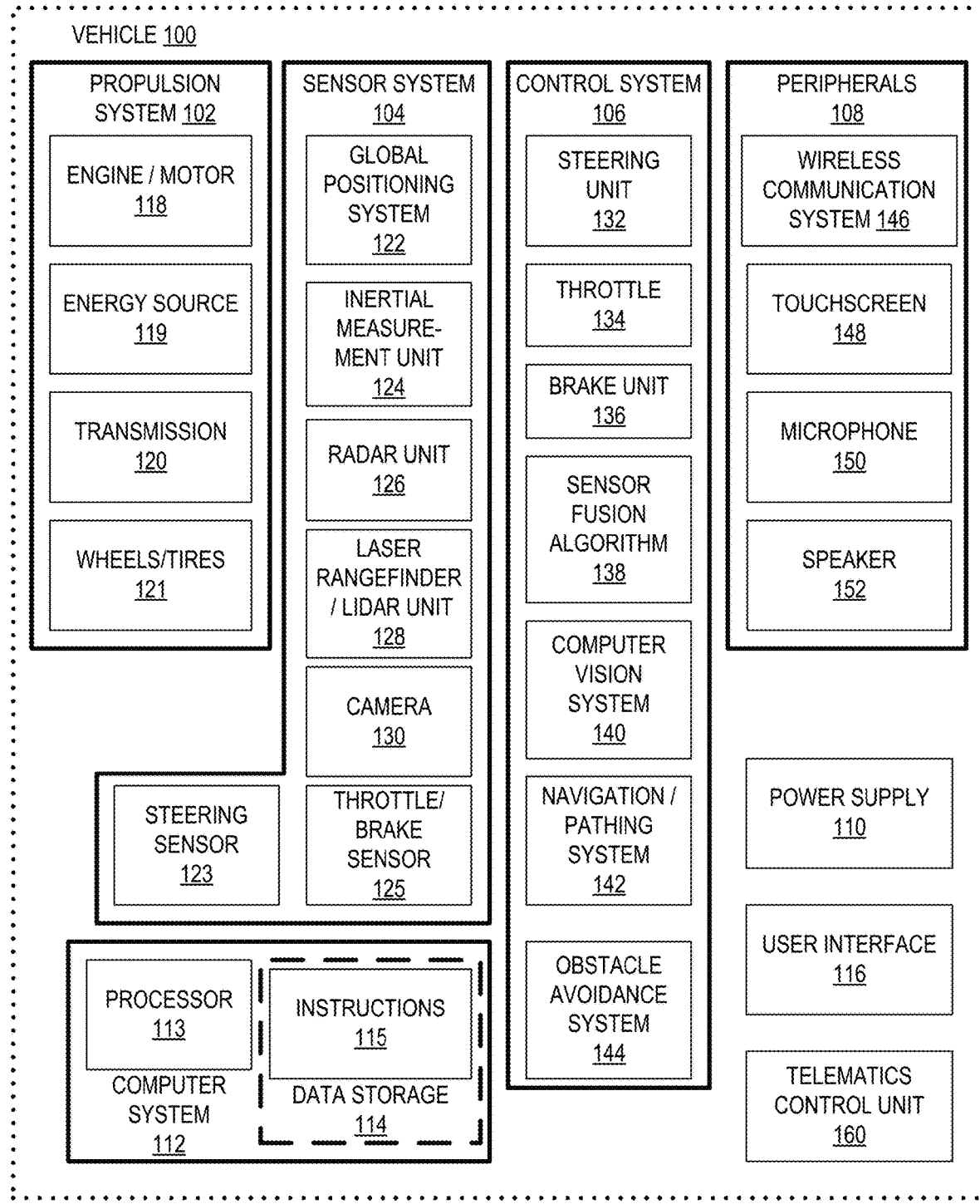
FIG. 1 is a functional block diagram illustrating a vehicle, according to one or more example embodiments.
Figure 2A:
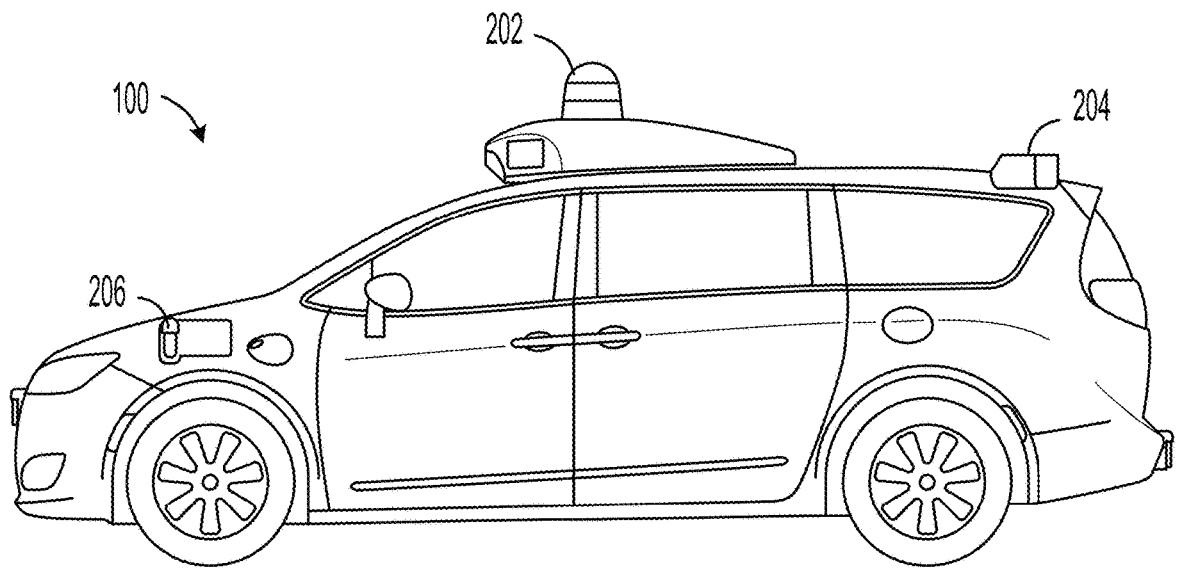
FIG. 2A illustrates a side view of a vehicle, according to one or more example embodiments.
Figure 2B:
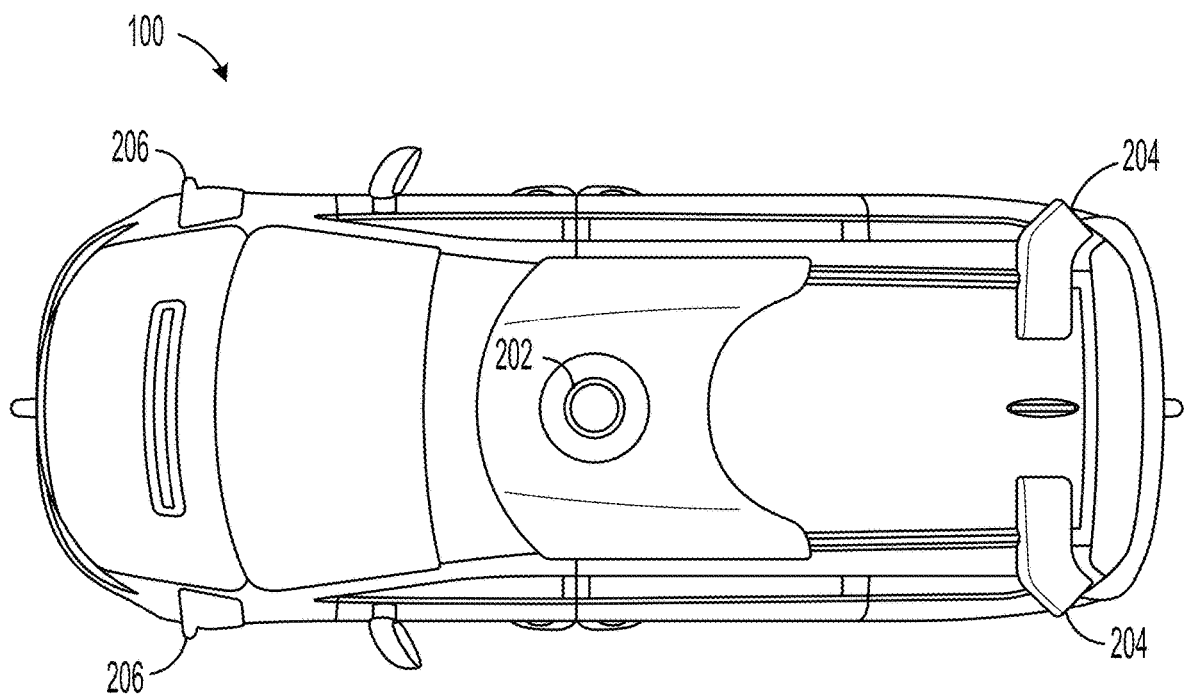
FIG. 2B illustrates a top view of a vehicle, according to one or more example embodiments.
Figure 2C:
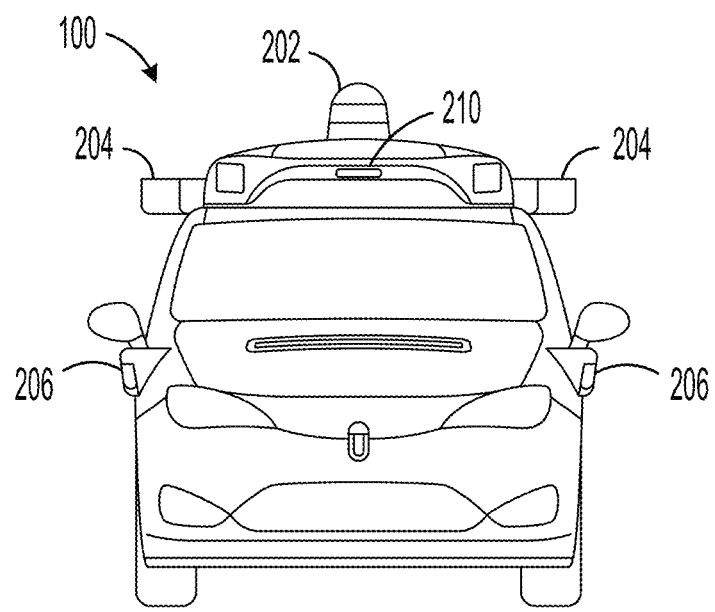
FIG. 2C illustrates a front view of a vehicle, according to one or more example embodiments.
Figure 2D:
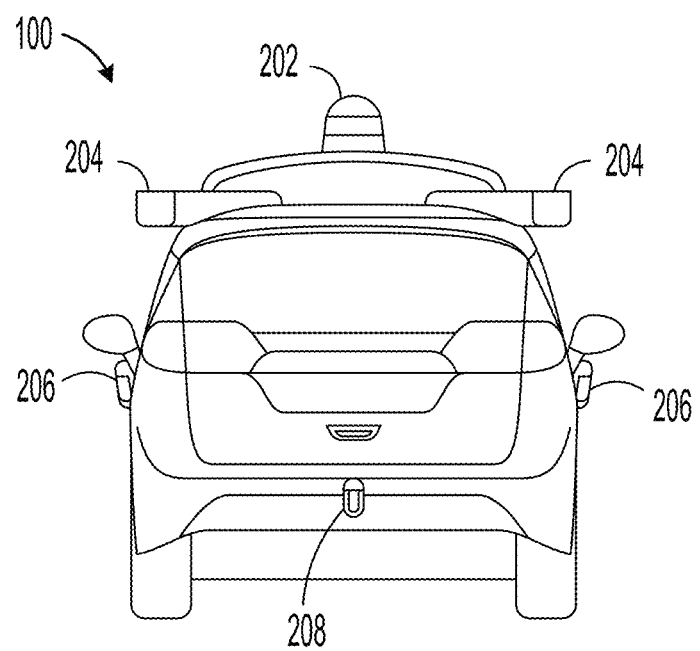
FIG. 2D illustrates a back view of a vehicle, according to one or more example embodiments.
Figure 2E:
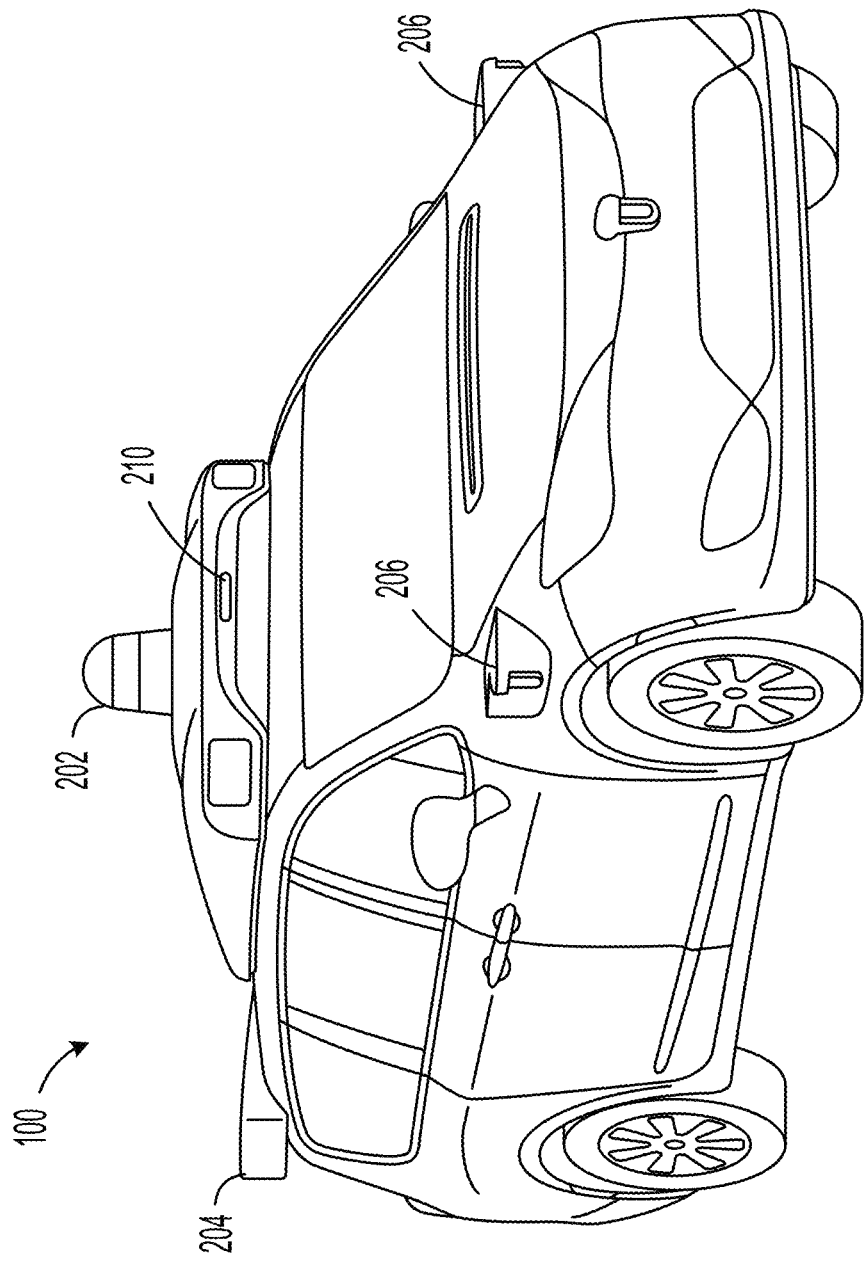
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or more antennas (radiating elements) to emit radar signals into an environment, which can enable subsequent measurements of aspects of the environment. In particular, upon coming into contact with surfaces in the environment, the radar signals can scatter in multiple directions with some of the radar signals passing through some surfaces while other radar signals reflect off and travel back towards one or more reception antennas of the radar system. A radar processing system (or another processing unit) may process the radar reflections to generate two dimensional (2D) and/or three dimensional (3D) measurements that represent aspects of the environment, such as the positions, orientations, and movements (including non-movement) of nearby objects and other surfaces occupying the environment near the radar system.

Because a radar system can be used to measure distances, positions, and motions of surrounding objects and other surfaces, vehicles are increasingly incorporating vehicle radar systems to generate measurements during operation that can assist with vehicle navigation, obstacle detection and avoidance, and in other ways that can boost overall vehicle safety. For instance, a vehicle may use radar to detect and identify the positions, orientations, and/or movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the position of traffic signs and signals and/or other road infrastructure.

In some applications, a vehicle radar system is used to assist a driver controlling the vehicle. For instance, radar measurements may be used to generate alerts when the vehicle drifts outside its lane, when the vehicle travels too closely to another vehicle or object, and/or in other ways that can help the driver. Radar measurements can also be used to help enable autonomous operations of the vehicle. Particularly, certain types of radar can be used along with other sensor measurements to help an autonomous vehicle understand its environment and detect changes in the environment in real or near real-time as discussed above.

Many vehicle radar systems are designed to operate within 5 Gigahertz (GHz) of a spectral region that extends between 76 GHz and 81 GHZ, inclusive. Although the 5 GHz spectral region offers plenty of bandwidth to accommodate a single vehicle radar system, issues can arise when multiple vehicle radar systems are operating in the same general location. In particular, because each vehicle radar system may be transmitting radar signals at frequencies between 76 GHz and 81 GHz in the same general environment, interference can occur between radar signals from different radar systems. Interference can occur when two (or more) radars in relatively close proximity are operating on the same frequency or frequencies and can negatively impact radar reflection processing for both radar systems. As such, interference can decrease a vehicle radar system's ability to appropriately measure aspects of the surrounding environment.

With the number of vehicles that include radar continuing to increase overall, vehicle radar systems are more likely to encounter interference during operation within various environments, especially in cities and other areas with dense populations that, for example, typically have more vehicles navigating in multiple directions, may have roadway infrastructure that use radio frequency system within the relevant frequency band, and/or may have more radio frequency devices emitting signals within the relevant frequency band into the roadway environment. Thus, there exists a need to be able to avoid or decrease the potential negative impacts (e.g., interference) that can arise when multiple radar systems are operating within the same frequency band in the same environment.

To help avoid or decrease interference, for example, a vehicle radar system can be switched to a passive receive-only mode that temporarily suspends radar signal transmission in order to enable reception antennas to receive electromagnetic energy (e.g., radar signals) that originated from external emitters other than the vehicle radar system itself. By measuring signals from other surrounding emitters, the vehicle radar system may be able to adjust operations to reduce interference with these emitters. This technique, however, might periodically impact the vehicle radar system's ability to measure the surrounding environment when radar units are switched to the passive receive-only mode.

Another technique that vehicle radar systems can use to mitigate interference involves using models developed based on datasets generated to represent the operation parameters of external emitters that a vehicle may encounter during navigation. In order to develop an accurate understanding of potentially-interfering radar signals produced by other vehicle radar systems and other types of external emitters, reference datasets representing potential interferer signals can be generated and used as inputs into a signal processing model (which may involve machine learning models) that characterizes the parameters of such radar signals. Examples of these parameters can include bandwidth, center frequency, pulse width, ramp rate, gap between pulses, pulse rate, and hold-off time. However, collecting and manually labeling these reference datasets can be time and resource intensive and can be susceptible to various types of errors, including human error.

Accordingly, to improve the efficiency and effectiveness with which a vehicle radar system can analyze and adapt to interference in a dynamic environment, example embodiments of this disclosure provide techniques for autonomous generation of large labeled reference datasets (e.g., comprising tens of thousands of samples) that accurately represent a large diversity of potential interferer signals that the vehicle radar system may encounter.

Disclosed techniques that generate large labeled datasets can be performed by one or more computing devices. For instance, a computing device can be coupled to and/or include a receiver, emitter, and/or other components. The computing device can be, for example, a computing device that is located remotely from the vehicle radar system and remotely from the vehicle itself, but that can transmit updated reference datasets to the vehicle or a fleet of vehicles.

In some examples, disclosed techniques can be performed by one or more digital radio frequency memory (DRFM) devices. A DRFM device can be used to digitally capture and retransmit RF signals. An example system may use one or more DRFM devices operating within a custom-built radar test chamber or another type of RF testing facility to generate large labeled datasets. In some instances, a radar unit may transmit a signal toward the DRFM device enabling the DRFM device to receive the signal and transmit another signal in response back to the radar unit. By receiving and subsequently transmitting a response, the DRFM device can be used to replicate different reflection properties and other parameters (e.g., different ranges). These signals received at the radar unit can then be added to a dataset as interferer signals with one or more labels based on the parameters used to simulate the transmission and reception between the DRFM device and the radar unit.

In addition, a DRFM device can also be configured to receive signals from an emitter and subsequently provide a digital duplicate of the received signal. The DFRM device can receive each transmitted signal and produce a duplicate that can be represented in the labeled dataset. Labels can be assigned to received signals based on the known transmission parameters (e.g., waveform, frequency, timing) used by the emitter and other testing parameters (e.g., a range simulated by the DRFM device, temperature in the testing facility, and an orientation between the emitter and the DFRM device).

In some examples, the computing device can generate and emit a simulated interferer signal having a set of parameter values known to be associated with a particular type of radar system that can be the source of interference with the vehicle radar system, such as a linear frequency modulated (LFM) radar. To facilitate this, for instance, the computing device can create or access a parametric model of a variety of potential interferer signals (e.g., LFM radar signals) that have a higher likelihood of causing interference with the vehicle radar system. In addition, the parametric model may represent different operation parameters for a given type of radar system or another type of emitter.

The computing device can then randomly sample the parameter space to generate various simulated interferer signals that each have a corresponding different set of parameter values. Thus, for each set of parameter values, the computing device can have the emitter transmit a simulated interferer signal having the set of parameter values, which the receiver can then receive during dataset generation. The receiver can be a receiver of a radar system that is operating in a passive receive-only mode. Further, the radar system can be a radar system similar or identical in configuration to the vehicle radar system. For example, the radar unit used to receive sample interference signals can be the same type used on vehicles, but positioned within a radar chamber for controlled testing and development of the datasets.

In some situations, the simulated interferer signal that is transmitted can include one or more spurious artifacts, such as bleed resulting from a local oscillator of the computing device or other types of spurious signals. Such spurious artifacts can be undesirable because such artifacts might not typically be present in the interferer signals that the vehicle radar system would encounter in its environment. Thus, it can be desirable to process the received simulated interferer signal to remove (e.g., cover, or delete and replace) spurious artifacts so that the reference dataset accurately reflects the type of interferer signal that the vehicle radar system is likely to encounter during operation. To facilitate this, for example, the computing device can replace or cover the artifacts with noise, since noise can be commonly present in signals received by the vehicle radar system during operation.

Once any spurious artifacts are removed, the computing device can generate a reference interferer dataset that includes the simulated interferer signal. This process can be performed iteratively to generate a reference interferer dataset that includes a large quantity (e.g., ten thousand to sixty thousand) of simulated interferer signals in a significantly shorter period of time than it would take to generate a similar quantity and quality reference interferer dataset using conventional methods. The reference interferer dataset can then be used to train software that the vehicle radar system uses to detect and adjust its operation, such as by transmitting adjusted signals to reduce or eliminate interference.

Disclosed techniques can further involve developing models and/or radar software updates based on generated datasets. In some examples, radar software updates may be developed using the labeled datasets. These software updates can be generated to factor the potential RF interference that vehicles may encounter during navigation and can be distributed to vehicles via an over-the-air update. In some examples, machine learning and/or other deep learning techniques can use the large labeled datasets to develop radar software that works effectively in RF dense environments (e.g., during vehicle operation within a city or airport).

The software models and/or radar software updates can be used by vehicle radar systems to differentiate desired radar reflections from interference produced by other emitters. For instance, a vehicle radar system can receive electromagnetic energy and use a software model to determine that the received electromagnetic energy corresponds to radar signals transmitted by a radar unit of the vehicle radar system and does not correspond to an interferer signal from another emitter. A processing unit can then process the received electromagnetic energy and use the processed electromagnetic energy to generate a real-time or near real-time map or other representation (e.g., an image or a data stream) of the environment of the vehicle.

In some examples, techniques for detecting interference using software models generated using the developed interferer datasets, and adjusting vehicle operation in response to the detected interference can be performed locally by one or more processing units onboard a vehicle. In other examples, techniques for detecting interference using software models generated using the developed interferer datasets, and adjusting vehicle operation can be executed using assistance from one or more external computing devices. For example, each vehicle may communicate with a central system to obtain information that can supplement the performance of a radar interference technique locally at the vehicle. The central system may provide models and/or other radar software updates developed based on labeled datasets to vehicles. In addition, one or more external computing devices may perform processing techniques and communicate with local processing units positioned on the vehicle in some cases.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

In some cases, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside or the vehicle). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radar units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

In practice, as a vehicle operates, the vehicle's radar system may periodically survey and quantify the occurrence of emitters and interference in the automotive radar band (e.g., between 76 GHz and 81 GHZ, inclusive). A processing unit may use measurements from the vehicle radar system to determine a real time or near real time view or representation of the spectrum occupancy in the vehicle's general environment. The spectrum occupancy representation can be used to detect if any potential interference may arise due to other electromagnetic energy radiating in the area, which can enable a processing unit to adjust vehicle radar system operations, e.g., dynamically, for a certain period of time, while within a certain geographical area, or while operating within a certain operating domain, to avoid one or more impacted channels. For example, measurements of external radiating energy can be used to find a region of the automotive radar spectral region that is unoccupied, which can then be subsequently used by the vehicle radar system to avoid interference. In some instances, a processing unit may analyze the spectrum occupancy representation developed based on the vehicle's current location and subsequently identify one or more patterns of interference that can minimize interference (or are compatible with interference mitigation of the radar). The processing unit may also adjust polarization used by the vehicle radar system based on information corresponding to electromagnetic energy in the environment.

A vehicle radar system may use multiple receive apertures (antennas) to receive electromagnetic waves radiating in the vehicle's environment. For instance, the vehicle radar system may use antennas (e.g., a linear array of antennas) on one or more radar units coupled to the vehicle to receive radiating electromagnetic waves in the area that originated from one or more external emitters. By using multiple receive apertures, a processing unit may analyze the received electromagnetic waves to determine a line of bearing to the emitter. For example, the processing unit may use a Frequency Difference of Arrival (FDOA) process and/or a Time Difference of Arrival (TDOA) process to determine a location of the external emitter (e.g., another vehicle) that transmitted the electromagnetic energy relative to the vehicle's position, which can then be factored as part of the navigation strategy.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
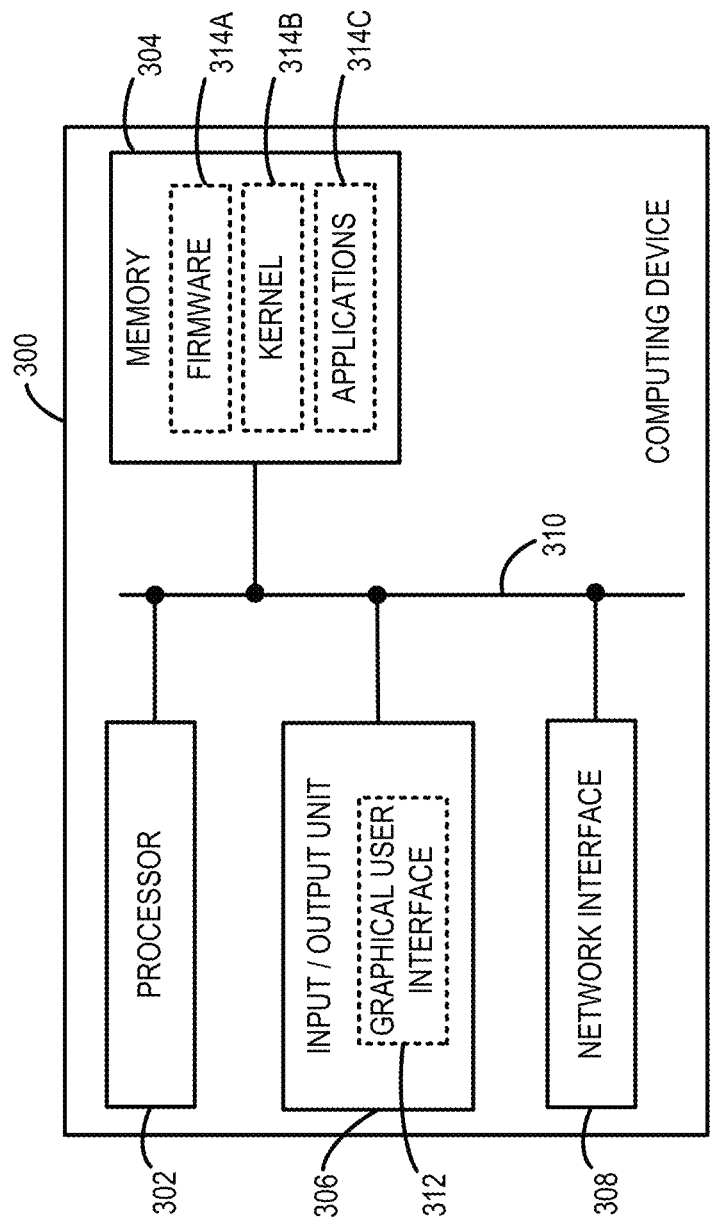
FIG. 3 is a simplified block diagram for a computing device, according to one or more example embodiments.

FIG. 3 is a simplified block diagram exemplifying a computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include machine learning software, examples of which can include one or more neural network applications and other deep learning-based applications. Memory 304 may also store data used by these and other programs and applications. As a more specific example, applications 314C can include machine learning software (e.g., a machine learning model) that can be trained with training data to help the machine learning software be used by vehicle radar systems to more easily and accurately detect and adapt to radar interference.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may have one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (WiFi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and WiFi interfaces. In some embodiments, network interface 308 may enable computing device 300 to connect with one or more vehicles to allow for remote assistance techniques for assisting vehicle operations such as interference detection or other processing performed at the vehicle 100.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

In addition, computing device 300 may enable the performance of embodiments described herein, including generation of labeled datasets and training machine learning software using the labeled datasets.

Figure 4:
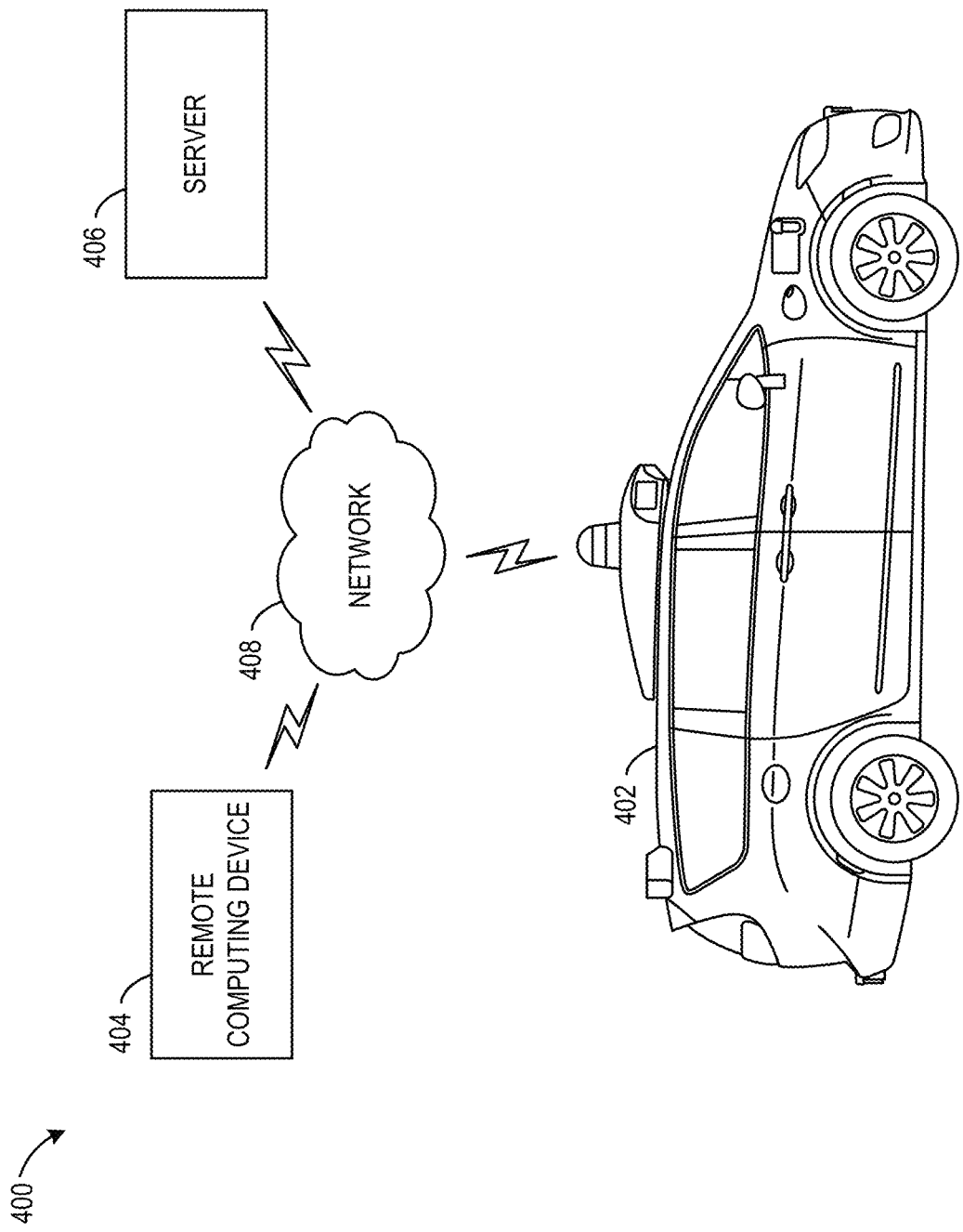
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in the autonomous mode, vehicle 402 may navigate and pick up and drop off passengers (or cargo) between desired destinations by relying on sensor measurements to understand the surrounding environment. In some embodiments, vehicle 402 can operate as part of a fleet, which may be managed by a central system (e.g., remote computing device 404 and/or other computing devices).

Remote computing device 404 may represent any type of device configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 402). Further, in some implementations, the remote computing device 404 can take a form that is the same as or similar to computing device 200 and can include one or more of the components of the computing device 200 illustrated in FIG. 3.

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device or devices configured to receive, store, determine, and/or send information relating to vehicle 402 and the remote assistance thereof. In some implementations, any of the one or more computing devices of server 406 can take a form that is the same as or similar to computing device 200 and can include one or more of the components of the computing device 200 illustrated in FIG. 3.

Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to radar interference training data generation techniques described herein. For example, if the vehicle 402 encounters an emitter having radar signal parameters that the vehicle 402 does not recognize, the vehicle 402 can send the parameters to remote computing device 404 and/or server 406, possibly along with any other information about the emitter that the vehicle 402 determines (e.g., a make and model of a vehicle having the emitter). Those parameters and other information can be stored and added to the dataset with which algorithms that are used to reduce interference are trained, which can further improve future performance of radar interference detection and reduction by vehicle 402 and/or other vehicles in a fleet to which vehicle 402 belongs. Other examples are possible as well.

Figure 5:
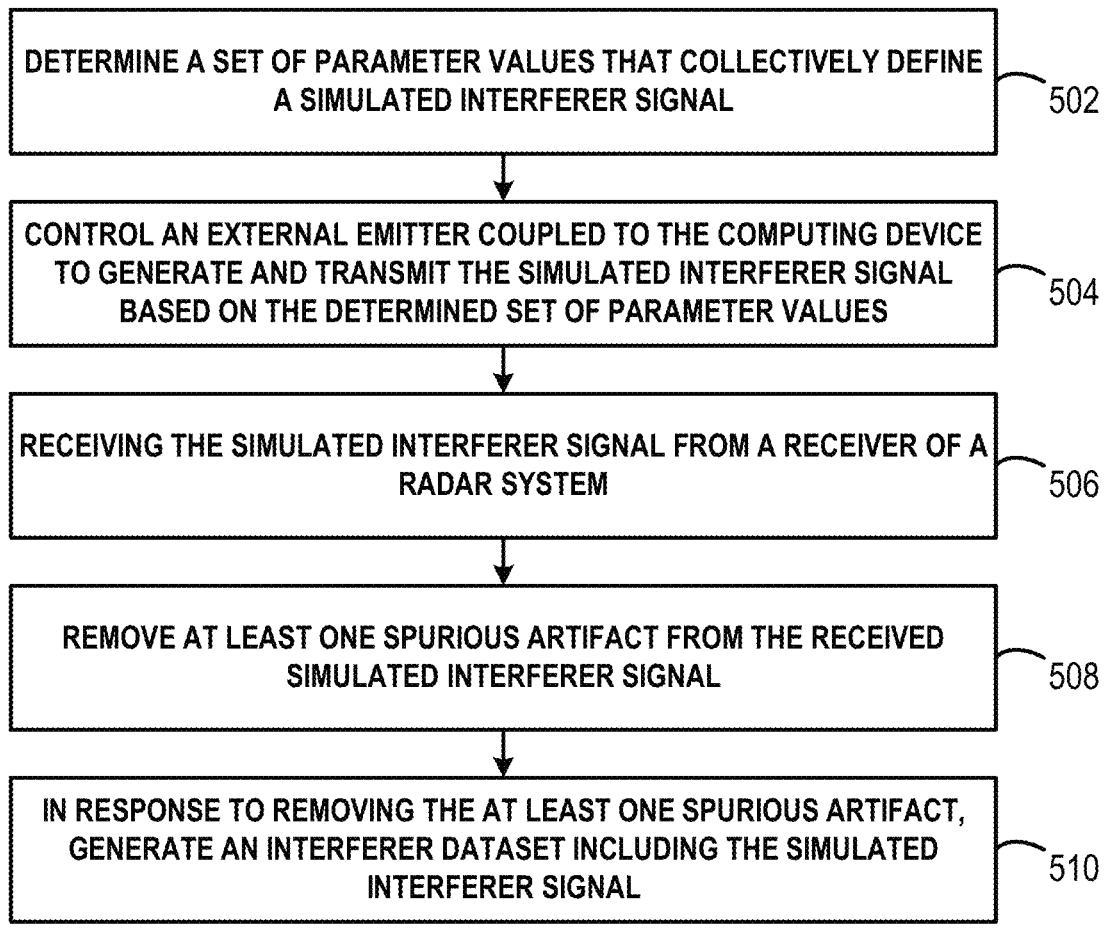
FIG. 5 is a flow chart of a method for automated generation of radar interference reduction training data, according to example embodiments.

FIG. 5 is a flowchart of example method 500 for automated generation of radar interference reduction training data, according to an example embodiment. Phrased another way, method 500 relates to generating training data to improve the characterization of sources of radar interference. Method 500 may include one or more operations, functions, or actions, as depicted by one or more of blocks 502, 504, 506, 508, and 510, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Method 500 can be performed in whole or in part by a computing device, such as a device similar to or the same as computing device 300 described above. In some embodiments, the computing device can be located remotely from (e.g., not onboard) a vehicle or vehicles, such as remote computing device 404 or server 406, but can be used to provide such vehicle(s) and associated vehicle computing system(s) (e.g., computer system 112) with information that can be used by the associated vehicle computing system(s) to analyze and adapt to radar interference in a driving environment.

Although the computing device described in connection with method 500 is described primarily as being remote from a vehicle or vehicles with which it is in communication, it should be understood that in other embodiments, the computing device can be a computing device located onboard a vehicle and communicatively coupled to a vehicle computing system of the vehicle. For instance, the computing device can perform operations of method 500 to train the vehicle's radar system when the vehicle is in an environment in which radar interference is not present. Thus, in such an environment, the computing device can generate training data without risk of external interference disrupting the operations described below. For example, a vehicle computing system on the vehicle can perform method 500 while the vehicle is driving in an environment with a threshold low likelihood of encountering interference from external emitters, or can perform method 500 while the vehicle is stationary in such an environment.

At block 502, method 500 involves determining a set of parameter values that collectively define a simulated interferer signal.

In some examples, the determined set of parameter values can be or include parameter values that are known to be associated with a particular type of radar system and that collectively define a simulated interferer signal associated with that particular type of radar system. In other examples, the determined set of parameter values can be or include parameter values that might not be associated with a particular known type of radar system, but could represent a hypothetical potential radar system that could exhibit those parameters should such a radar system exist and should the vehicle encounter such a radar system. In addition, sample interference signals can also be generated based on other types of emitters.

The set of parameter values can include, for example, a center frequency, a bandwidth, a spectral region occupied, a ramp rate, a ramp duration, an idle time, a gap between pulses, a pulse width, a hold off time, a modulation type, a pulse repetition rate, a ramp repetition rate, and/or other possible parameters. The particular type of radar system can be a type of radar system known or expected to be a source of interference with the vehicle radar system (e.g., known to transmit radar signals that interfere with radar signals transmitted by the vehicle radar system), such as a LFM radar. In some embodiments, the set of parameter values that are determined can be determined for a particular make and model of a vehicle or other source of interference.

In some embodiments, the act of determining the set of parameter values can involve determining a radar signal parameter model and then selecting the set of parameter values from the radar signal parameter model. A radar signal parameter model (also referred to herein as the parameter space) can include, for each of a plurality of radar signal parameters such as those described above, one or more corresponding parameter values. Such parameter values can be or include parameter values that are known to be associated with a particular type of radar system, or can be or include parameter values that might not be associated with a particular known type of radar system, but could represent a hypothetical potential radar system that could exhibit the parameters represented by the model. The computing device can select the set of parameter values such that the set of parameter values includes a particular one of the parameter values for each of the plurality of radar signal parameters. In some embodiments, the selection can take the form of a random sampling such that a random sample of parameter values is selected.

To illustrate, an example radar signal parameter model is shown below in Table 1, and an example random sampling of the example radar signal parameter model is then shown below in Table 2.

TABLE 1

| Parameter | Value Range |
| --- | --- |
| Center Frequency | 76-81 GHz |
| Ramp Rate | −10 to 10 Terahertz per second (THz/s) (negative values being descending ramps, right to left, in the frequency spectrum |
| Ramp Duration | 10 to 120 microseconds |
| Idle Time | 0.5 to 30 microseconds |

TABLE 2

| Parameter | Randomly Sampled Value |
| --- | --- |
| Center Frequency | 78.427 GHz |
| Ramp Rate | 9.1433 THz/s |
| Ramp Duration | 98.031 microseconds |
| Idle Time | 4.6856 microseconds |

As shown, the parameter values of the radar signal parameter model that correspond to the center frequency include a range of center frequencies from 76 GHz to 81 GHz, inclusive. However, for the center frequency and/or any other parameter, other values or ranges of values are possible in alternative embodiments.

In some embodiments, at least a portion of the radar signal parameter model can be determined by the computing device. Additionally or alternatively, at least a portion of the radar signal parameter model can be received by the computing device from another computing device (e.g., server 406).

At block 504, method 500 involves controlling an external emitter coupled to the computing device to generate and transmit the simulated interferer signal based on the determined set of parameter values. This operation as well as others of method 500 are described hereafter with respect to FIG. 6.

Figure 6:
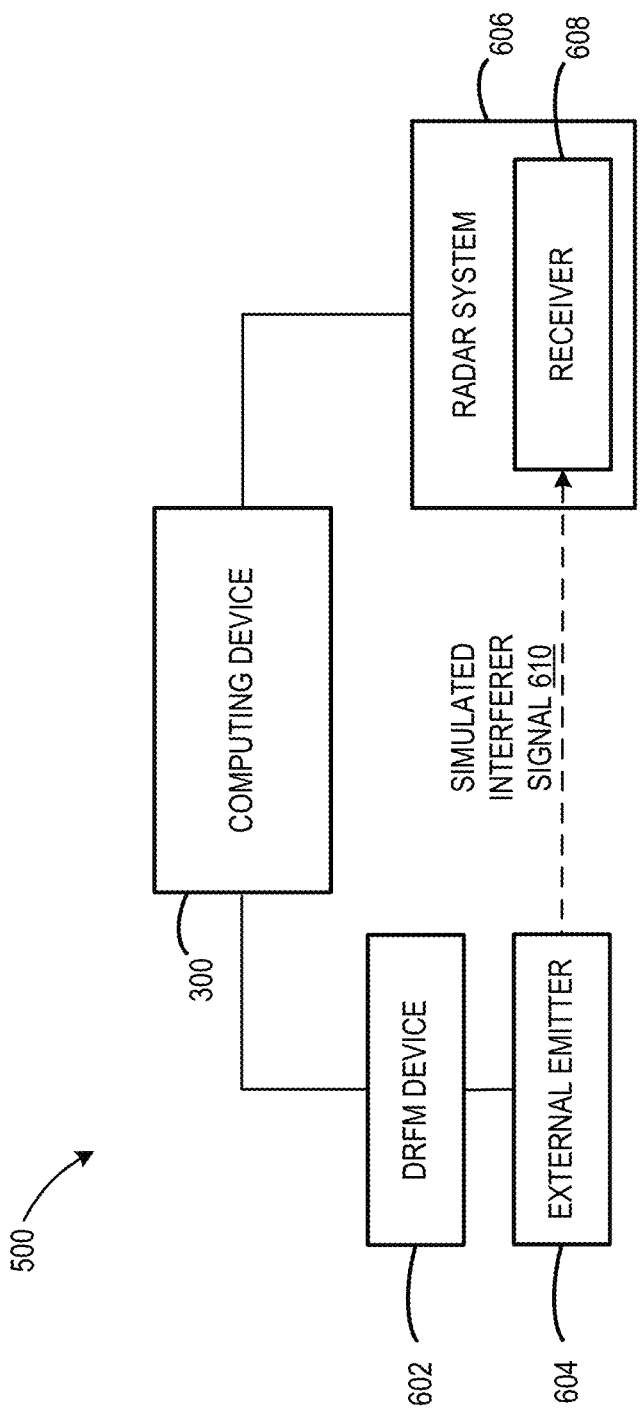
FIG. 6 is a system for automated generation of radar interference reduction training data, according to an example embodiment.

FIG. 6 is a system 600 for automated generation of radar interference reduction training data, according to an example embodiment. The system 600 includes computing device 300, DRFM device 602, external emitter 604, and radar system 606. As further shown, radar system 606 includes receiver 608. The solid lines depicted between the aforementioned components in FIG. 6 can represent any wired or wireless communication link that can exist between such components and over which such components can transmit and receive information.

DRFM device 602 can be any type of DRFM device having analog and digital components, such as a processing unit/control unit, a memory, an input-output unit, an analog-to-digital converter, a digital-to-analog converter, a power source, mixers, and/or a local oscillator. DRFM device 602 can be programmed to generate RF signals that external emitter 604 can emit into an environment. Alternatively, another type of radar target simulator device can be used in other embodiments.

External emitter 604 can be or include an antenna, antenna array, and/or other components that is/are configured to emit electromagnetic energy in the form of radar signals. In some embodiments, external emitter 604 can be an emitter of the particular type of radar system with which the simulated interferer signal is associated. For instance, external emitter 604 can be an emitter of a LFM radar system or other specific type of radar system. External emitter 604 is "external" in the sense that it is not located as part of, and is thus external to, radar system 606.

Radar system 606 can be a radar system that is similar to or the same as a vehicle radar system that is used in operation by a vehicle, or that can take the form of any other radar system described herein. In some embodiments, radar system 606 can be designed to only receive electromagnetic energy. In other embodiments, radar system 606 can include multiple modes of operation, including at least one mode in which radar system 606 can emit electromagnetic energy, but can be configured to switch (e.g., at the instruction of computing device 300) one or more of its radar units to a passive receive-only mode in order to only receive the electromagnetic energy radiating in the environment from external emitter 604. For instance, radar system 606 may be configured to switch to the passive receive-only mode for a threshold duration (e.g., 5-10 milliseconds) to detect any electromagnetic energy.

Receiver 608 can be an antenna, antenna array, or other type of device configured to receive electromagnetic energy.

In line with the discussion above with respect to block 504 of method 500, computing device 300 can control external emitter 604 (e.g., control DRFM device 602, which uses external emitter 604) to generate and transmit a simulated interferer signal 610 based on the determined set of parameter values. For example, computing device 300 can transmit, to DRFM device 602, data including the determined set of parameter values and an instruction to generate a RF signal having those parameter values. Upon receipt of the data, DRFM device 602 can generate the simulated interferer signal 610 and cause external emitter 604 to transmit the simulated interferer signal 610.

Referring back to FIG. 5, at block 506, method 500 involves receiving the simulated interferer signal from a receiver of a radar system. For example, computing device 300 can be configured to control operation of receiver 608, such as turning receiver 608 on and off and adjusting a channel or channels to which receiver 608 is tuned. As shown in FIG. 6, for instance, receiver 608 of radar system 606 receives the simulated interferer signal 610. In some examples, the operations at block 506 can be performed in a radar anechoic chamber or another type of testing facility in order to avoid unknown environmental interferences.

In some embodiments, the radar system that receives the simulated interferer signal (e.g., radar system 606) is associated with a vehicle radar system of a vehicle to which the trained machine learning software is transmitted. That is, the radar system that receives the simulated interferer signal at block 506 can be a replica, or a similarly-configured version, of a vehicle radar system that method 500 is being used help train to recognize and respond to interference.

In some embodiments, upon receipt of the simulated interferer signal 610 by the receiver 608, computing device 300 can produce a spectrogram of a frequency spectrum of a predetermined size (e.g., 5 GHz, from 76 to 81 GHZ) in which the simulated interferer signal 610 appears or another type of digital representation of the simulated interferer signal 610. It can be desirable to produce a spectrogram of such a size since vehicle radar systems may drive through an environment in which multiple interference signals exist at different parts of the spectrum.

At block 508, method 500 involves removing at least one spurious artifact from the received simulated interferer signal. The at least one spurious artifact is caused by the transmission of the simulated interferer signal. Phrased another way, block 508 can involve removing any artifacts that would not be present in a proper, unsimulated radar emission.

In practice, DRFM device 602, external emitter 604, and/or another component of system 600 can cause the simulated interferer signal 610 to include at least one spurious artifact that can distinguish the simulated interferer signal 610 from an interferer signal that would be produced by an actual interfering external emitter that a vehicle can encounter in the environment. It can be desirable for the training data generated by method 500 to mimic real-world interference as much as possible, so that vehicle radar systems can more accurately detect and respond to such interference. Thus, it can be desirable for the training data to represent the frequency spectrums where vehicle radar systems are operating, such as 76 to 81 GHz. For at least this reason, it can be desirable to remove spurious artifacts. Similarly, the presence of spurious artifacts can confuse algorithms or other signal processing used by computing device 300 and/or vehicle radar systems to detect and classify sources of interference, and thus it can be desirable to remove spurious artifacts for this reason as well.

As an example of a spurious artifact, DRFM device 602 can include a local oscillator and can produce the simulated interferer signal 610 at a particular offset from the local oscillator (e.g., if the DRFM device 602 has a bandwidth of 2 GHz and the set of parameters indicates that the simulated interferer signal 610 should have a center frequency of 77 GHz, it may be desirable to put the local oscillator within 2 GHz or less of 77 GHz, such as at 76 GHz). As a result, a phenomenon known as local oscillator bleed can occur, in which a signal of noticeable strength (e.g., 6-10 dB) might appear in the frequency spectrum and thus in the spectrogram that computing device 300 produces.

As another example, for various reasons, one or more other RF spurs can appear in the frequency spectrum and thus in the spectrogram that computing device 300 produces, such as local oscillator spurs and negative frequency images.

Figure 7B:
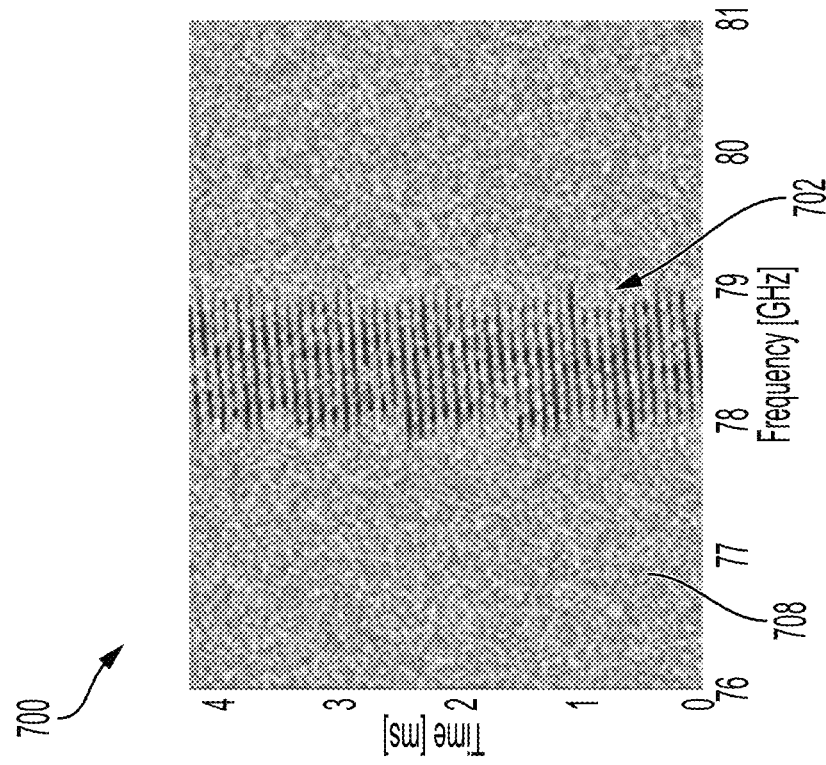
FIG. 7B depicts an example spectrogram representing a simulated interferer signal, according to an example embodiment.
Figure 7A:
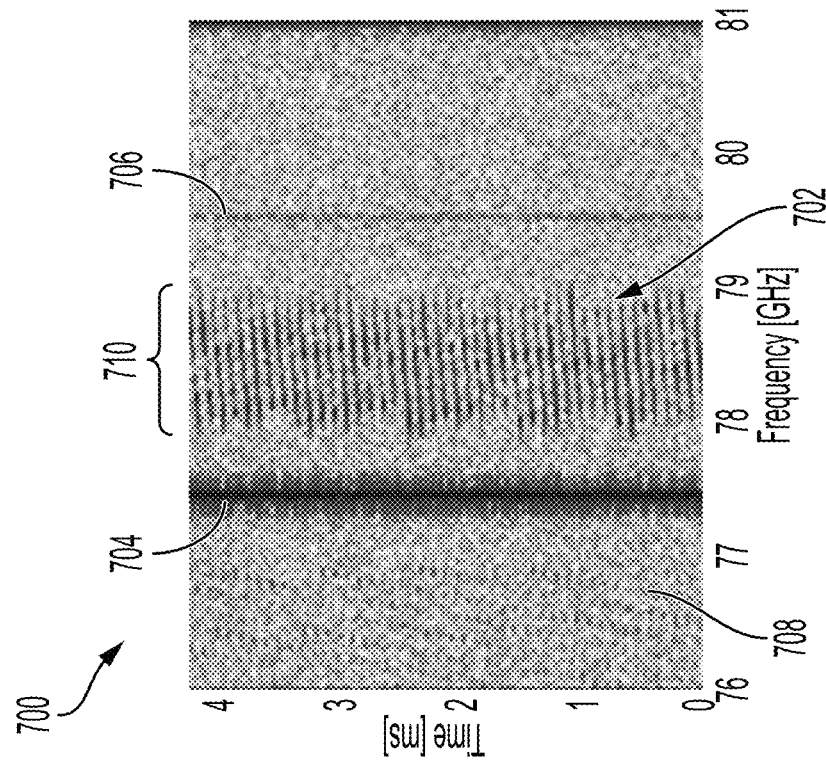
FIG. 7A depicts an example spectrogram representing a simulated interferer signal, according to an example embodiment.

Examples of how to remove spurious artifacts are described with respect to FIGS. 7A and 7B.

FIG. 7A depicts an example spectrogram 700 representing the simulated interferer signal 610. As shown, the spectrogram 700 includes interference 702, a first spurious artifact 704 and a second spurious artifact 706. In the example shown, the interference 702 is at approximately 78.427 GHz, the first spurious artifact 704 is local oscillator bleed at approximately 77.4 GHz, and the second spurious artifact 706 is a spur at approximately 79.5 GHz.

FIG. 7B then depicts the example spectrogram 700 after the first spurious artifact 704 and the second spurious artifact 706 have been removed, leaving only the interference 702 and noise 708.

To facilitate removal of the at least one spurious artifact, computing device 300 can process the received simulated interferer signal 610 in various ways, such as by adding noise to the received simulated interferer signal 610 at a spectral region of the received simulated interferer signal 610 that includes the at least one spurious artifact. For example, computing device 300 can estimate a noise level in a spectral region of the frequency spectrum (e.g., an average noise level), such as a noise level of noise 708, and add noise having the noise level where the first spurious artifact 704 and the second spurious artifact 706 are present, thus hiding the first spurious artifact 704 and the second spurious artifact 706 behind the added noise.

As another example, the act of removing the at least one spurious artifact from the received simulated interferer signal 610 can involve (i) removing, from the received simulated interferer signal 610, a spectral region outside of a predetermined frequency bandwidth and (ii) replacing the removed spectral region with noise. The predetermined frequency bandwidth corresponds to a bandwidth within which interference is expected to be present in the received simulated interferer signal. As shown in FIG. 7A, for instance, the interference 702 is present at frequency bandwidth 710. Thus, computing device 300 can delete the spectral region outside of frequency bandwidth 710 (and thus any artifacts in that spectral region, including the first spurious artifact 704 and the second spurious artifact 706), and replace the spectral region with noise 708, thereby resulting in the spectrogram 700 shown in FIG. 7B.

At block 510, method 500 involves in response to removing the at least one spurious artifact, generating an interferer dataset including the simulated interferer signal. Phrased another way, the data processed at block 508 is then used to generate an interferer dataset or is added to an existing inteferer dataset.

In some embodiments, the act of generating the interferer dataset including the simulated interferer signal can involve creating a new interferer dataset with, or adding to an existing interferer dataset, (i) data (e.g., a spectrogram) representing the simulated interferer signal after any spurious artifacts have been removed and (ii) associated metadata, including but not limited to labels that indicate the set of parameter values that were used to generate the simulated interferer signal. Further, if the set of parameter values are known to be associated with a specific type of emitter (e.g., vehicle radar system or another type of source), the metadata can also include labels identifying the specific type of emitter. Still further, if the emitter is known to be part of a specific vehicle, the labels identifying the manufacturer and model of the vehicle can be included as well. Other data and metadata can be included as part of the interferer dataset as well.

To generate a large interferer dataset, the operations of blocks 502-510 can be performed repeatedly. For example, numerous different random samplings of a parametric model can be performed to generate, emit, and receive a variety of different simulated interferer signals, which computing device 300 can then process to remove spurious artifacts. The resulting simulated interferer signals can then all be added to a single interferer dataset, or can make up a plurality of interferer datasets.

Having a large interferer dataset with a large diversity of potential interferers can improve the training of machine learning software that is configured for assisting vehicle radar systems in detecting and responding to interference. Thus, in some embodiments, method 500 can also include training such machine learning software using the generated interferer dataset. The trained machine learning software can then be transmitted to one or more vehicle computing systems of one or more vehicles, to facilitate each of the vehicle computing systems using the trained machine learning software as a basis for adjusting operation of a corresponding vehicle radar system of the respective vehicle. In some situations, the trained machine learning software can be pushed to a plurality of vehicles (e.g., a fleet) to improve operation of the plurality of vehicles, though in other situations, the trained machine learning software can be pushed to a single vehicle.

The manner in which a vehicle computing system and associated vehicle radar system respond to interference detected using the trained machine learning software can vary.

The vehicle radar system of the vehicle, alone or in combination with another processing unit (e.g., a processing unit of a vehicle computing system onboard the vehicle) may be configured to perform one or more interference reduction techniques. As the vehicle navigates, one or more processing units may cause the vehicle radar system of the vehicle to periodically and/or continuously monitor the environment for electromagnetic energy traversing from other emitters that are external to the vehicle. For example, the vehicle radar system may cyclically switch one or more of its radar units to a passive receive-only mode that enables antennas on the radar units to detect and receive radar signals from other vehicles in the environment.

In addition, in some examples, the passive receive-only mode may require the entire vehicle radar system to temporarily stop emitting radar signals to enable the reception of electromagnetic waves from external sources only. As such, the vehicle radar system may be configured to quickly change modes to ensure safe navigation. In some examples, the vehicle radar system may only switch modes to the passive receive-only mode when the vehicle is not moving (i.e., stopped).

The vehicle radar system or another processing unit may use received radar signals to quantify the occurrence of emitters and interference in the automotive band (e.g., the inclusive spectral region between 76 GHz and 81 GHz). For example, a processing unit may determine a spectrum occupancy representation that can provide a real time view (frequency versus time) of the spectrum occupancy in the general area of the vehicle. Other spectral regions (e.g., frequencies) may be analyzed within examples. For instance, the processing unit may determine a spectrum occupancy representation based on a 24 GHz spectral region and/or 120 GHz in other embodiments.

As noted above, the vehicle radar system of the vehicle can adjust operations to reduce or avoid potential interference based on the trained machine learning software. The trained machine learning software can enable the vehicle radar system to detect that one or more external emitters in the vehicle's environment is/are transmitting radar signals that may impact the performance of the vehicle radar system of the vehicle (e.g., radar signals that are the same as or within a threshold similarity to the simulated interferer signals that make up the dataset used to train the machine learning algorithm), and then responsively execute one or more adjustment techniques. For example, the vehicle radar system of the vehicle (and/or another processing unit) may find a region of the spectrum that is currently unoccupied (or minimally occupied relative to other regions of the spectrum) and select that region for use during subsequent transmission of radar signals. In some instances, the vehicle radar system (and/or another processing unit) may identify patterns of interference that can minimize interference during operation or are compatible with interference mitigation. For example, the vehicle radar system may implement a fast up-ramping radar mode that is compatible with a fast down ramping radio frequency interference. Similarly, the vehicle radar system of the vehicle may use a different modulation scheme. For instance, the vehicle radar system may use phase modulated and/or pulse waveforms as an interference mitigation strategy.

The vehicle may use measurements of signals produced by nearby emitters to enhance autonomous operations. For example, the vehicle may use the detection of radar signals from other vehicles and information derived based on the detection of these radar signals to supplement other sensor data from other vehicle sensors.

In some embodiments, the vehicle may communicate a spectrum occupancy representation in near-real time to one or more devices positioned externally from the vehicle. Particularly, the vehicle may share the spectrum occupancy representation and an indication of the spectral region or regions that its vehicle radar system will use to transmit radar signals with vehicles that are causing the interference. This way, those vehicles may adjust operations to avoid interference based on the indication and spectrum occupancy representation received from the vehicle.

In some cases, the vehicle or other computing system may identify a pattern of interference that reduces interference with the electromagnetic energy radiating in the environment based on the spectrum occupancy representation. The vehicle radar system may subsequently reduce interference with other vehicle radar systems by transmitting radar signals based on the pattern of interference identified by the processing unit.

In some examples, the vehicle or other computing system may update known information for an emitter, such as parameters of interferer signals that the emitter is expected to emit.

Figure 8:
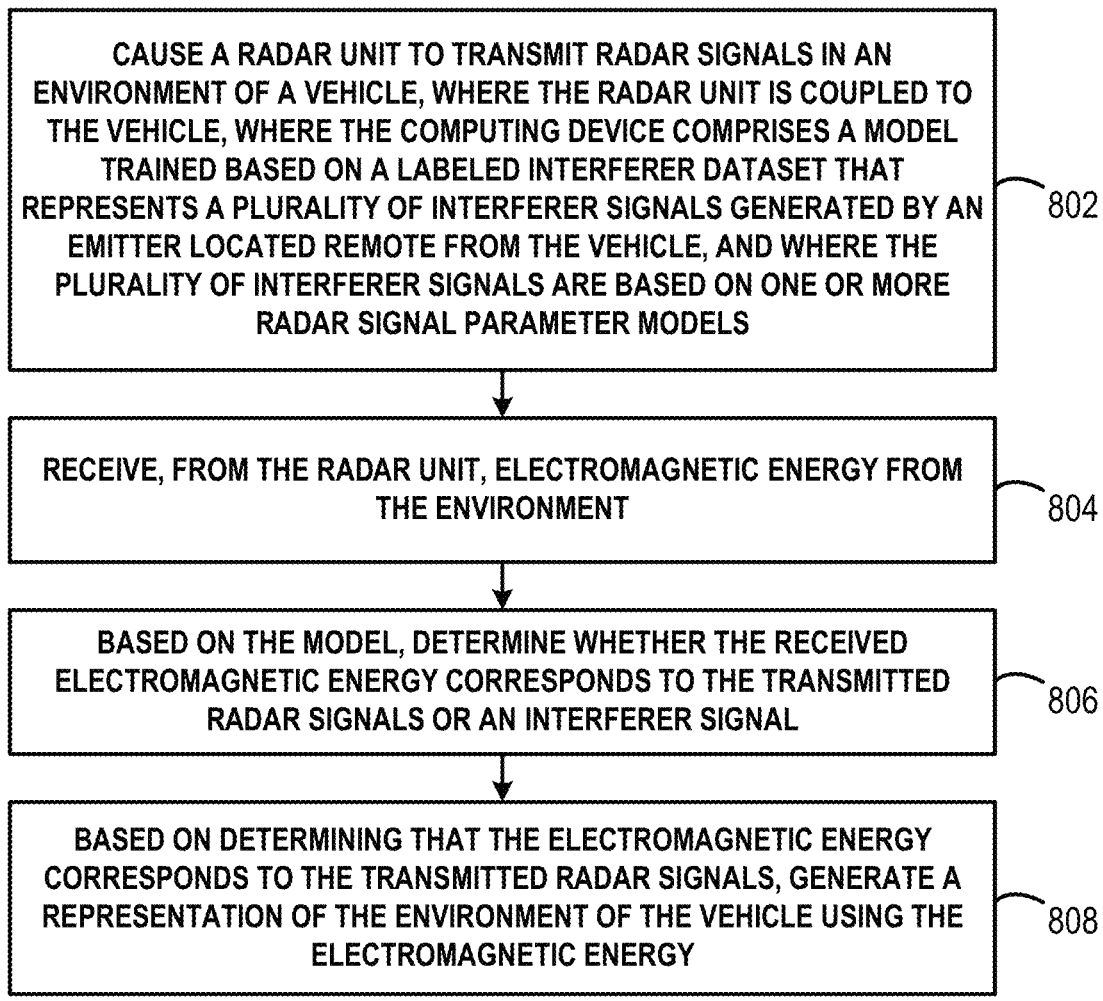
FIG. 8 is a flow chart of another example method, according to example embodiments.

FIG. 8 is a flowchart of an example method 800, according to an example embodiment. In particular, method 800 is a method for using a software model trained with the inteferer dataset described above in order to differentiate desired radar reflections from interference produced by other emitters, and then to use the desired radar reflections to generate a representation of the vehicle's environment. Method 800 may include one or more operations, functions, or actions, as depicted by one or more of blocks 802, 804, 806, and 808, each of which may be carried out by any of the systems shown in prior figures, among other possible systems.

Method 800 can be performed in whole or in part by a computing device, such as a device similar to or the same as computing device 300 described above. In some embodiments, the computing device can be located onboard a vehicle (e.g., vehicle 402) or vehicles. Additionally or alternatively, the computing device could be located remotely from (e.g., not onboard) a vehicle or vehicles, such as remote computing device 404 or server 406.

At block 802, method 800 involves causing a radar unit to transmit radar signals in an environment of a vehicle. The radar unit is coupled to the vehicle and the computing device may include a model trained based on a labeled interferer dataset that represents interferer signals generated by an emitter located remote from the vehicle. The interferer signals can be based on one or more radar signal parameter models. For instance, each interferer signal in the dataset can include one or more labels that depend on various parameters associated with the generation of the interferer signal. As an example, an interferer signal represented in the dataset can include one or more labels indicating transmission parameters used by the emitter, such as frequency, waveform, timing, and polarization. The interferer signals can also include other labels determined based on testing conditions. For instance, labels can specify ranges, azimuths, temperatures, and other conditions used during the generation of each interferer signal represented in the labeled dataset. The quantity of labels associated with interferer signals can differ within examples.

At block 804, method 800 involves receiving, from the radar unit, electromagnetic energy from the environment.

At block 806, method 800 involves determining whether the received electromagnetic energy corresponds to the transmitted radar signals or an interferer signal based on the model.

At block 808, method 800 involves generating a representation of the environment of the vehicle using the electromagnetic energy based on determining that the electromagnetic energy corresponds to the transmitted radar signals. For example, the computing device can process the electromagnetic energy to determine a distance and direction to an object in the environment and generate 3D point cloud data representing at least a portion of the object (and thus representing a portion of the environment of the vehicle).

In some embodiments, the model that is used to distinguish the transmitted radar signals from an interferer signal can be generated via machine learning software that is trained using an labeled interferer dataset as described above.

In some embodiments, the act of determining whether the electromagnetic energy corresponds to the transmitted radar signals or the interferer signal can involve applying a filter to the electromagnetic energy to remove a first portion of the electromagnetic energy corresponding to one or more interferer signals. The representation of the environment can thus be generated using a second portion of the electromagnetic energy (e.g., the remaining portion after the first portion is removed). Further, the filter that is applied can be based on the model. For instance, the filter can be configured to remove signals having the same parameters as one or more of the plurality of interferer signals represented by the labeled interferer dataset of the model.

As discussed above, the emitter can be a DRFM device located in a radar test chamber, where the DRFM device is configured to transmit each interferer signal from the plurality of interferer signals based on a random sample of transmission parameters from a given radar parameter model. As such, the labels for each interferer signal from the plurality of interferer signals can depend on the transmission parameters that the DRFM device uses to transmit the interferer signal.

As further discussed above, the radar signal parameter models can include radar signal parameter models corresponding to different types of vehicle radar systems. For instance, the one or more radar signal parameter models can include a first radar signal parameter model corresponding to a first type of vehicle radar system (e.g., an LFM radar system) and a second radar signal parameter model corresponding to a second type of vehicle radar system (e.g., a frequency modulated continuous wave (FMCW) radar system).

As further discussed above, generation of the labeled interferer dataset can involve a removal of one or more spurious artifacts from the labeled interferer dataset prior to training the model based on the labeled interferer dataset. The one or more spurious artifacts can be caused by generation by the emitter located remote from the vehicle, and can include artifacts such as local oscillator bleed. In some cases, the removal of the one or more spurious artifacts can involve an addition of noise at a spectral region of a received simulated interferer signal that includes a given spurious artifact. In other cases, the removal of the one or more spurious artifacts can involve a removal of a spectral region outside of a predetermined frequency bandwidth from a received simulated interferer signal and a replacement of the removed spectral region with noise. The predetermined frequency bandwidth can correspond to a bandwidth within which interference is expected to be present in the received simulated interferer signal.

Figure 9:
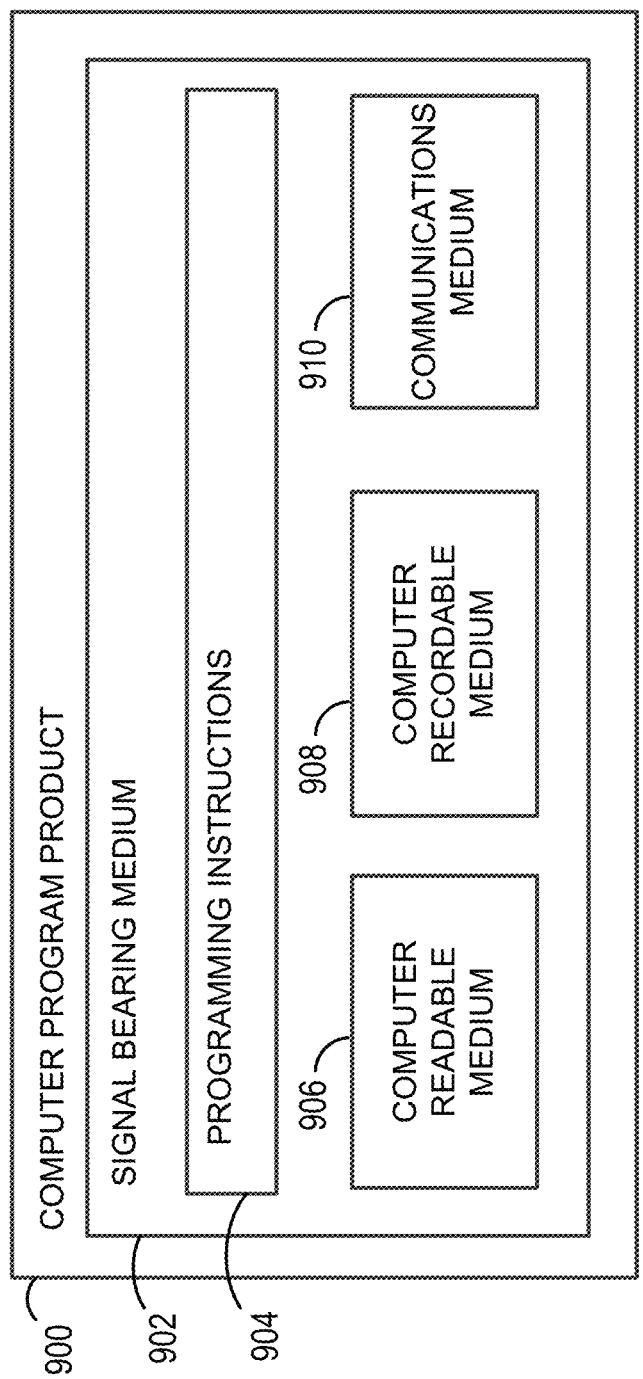
FIG. 9 is a schematic diagram of a computer program, according to example implementations.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 may be configured to provide various operations, functions, or actions in response to the programming instructions 904 conveyed to the computer system 112 by one or more of the computer readable medium 906, the computer recordable medium 908, and/or the communications medium 910. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   causing, by a computing device, a radar unit to transmit radar signals in an environment of a vehicle, wherein the radar unit is coupled to the vehicle,
      wherein the computing device comprises a model trained based on a labeled interferer dataset that represents a plurality of interferer signals generated by a digital radio frequency memory (DRFM) device located remote from the vehicle, wherein the DRFM device generates the plurality of interferer signals based on sets of transmission patterns randomly selected from one or more radar signal parameter models, wherein labels are automatically applied to the plurality of interferer signals to generate the labeled interferer data set after a removal of one or more spurious artifacts from the plurality of interferer signals, and wherein the one or more spurious artifacts are produced by the DRFM device during generation of the plurality of interferer signals;
   receiving, at the computing device and from the radar unit, electromagnetic energy from the environment;
   based on the model, determining whether the received electromagnetic energy corresponds to the transmitted radar signals or an interferer signal;
   based on determining that the electromagnetic energy corresponds to the transmitted radar signals, generating a representation of the environment of the vehicle using the electromagnetic energy;
   receiving, at the computing device and from a remote computing system, a second model, wherein the second model is trained based on the labeled interferer data set after a plurality of modifications to the labeled interferer data set; and
   subsequently using the second model to determine whether received electromagnetic energy corresponds to transmitted radar signals or one or more interferer signals.

2. The method of claim 1, wherein determining whether the electromagnetic energy corresponds to the transmitted radar signals or the interferer signal comprises:
   applying a filter to the electromagnetic energy to remove a first portion of the electromagnetic energy corresponding to one or more interferer signals, wherein the filter is based on the model; and
   wherein generating the representation of the environment of the vehicle using the electromagnetic energy comprises:
   generating the representation of the environment of the vehicle using a second portion of the electromagnetic energy.

3. The method of claim 1, further comprising:
   training machine learning software using the labeled interferer dataset; and
   generating the model via the trained machine learning software.

4. The method of claim 1, wherein labels for each interferer signal from the plurality of interferer signals depends on the transmission parameters used by the DRFM device to transmit the interferer signal.

5. The method of claim 1, wherein the one or more radar signal parameter models comprises a first radar signal parameter model corresponding to a first type of vehicle radar system and a second radar signal parameter model corresponding to a second type of vehicle radar system.

6. The method of claim 5, wherein the first type of vehicle radar system is a linear frequency modulated (LFM) radar system and the second type of vehicle radar system is frequency modulated continuous wave (FMCW) radar system.

7. The method of claim 1, wherein the one or more spurious artifacts includes local oscillator bleed.

8. The method of claim 1, wherein the removal of the one or more spurious artifacts comprises an addition of noise at a spectral region of a received simulated interferer signal that includes a given spurious artifact.

9. The method of claim 1, wherein the removal of the one or more spurious artifacts from a received simulated interferer signal comprises:
a removal of a spectral region outside of a predetermined frequency bandwidth from a received simulated interferer signal and a replacement of the removed spectral region with noise, wherein the predetermined frequency bandwidth corresponds to a bandwidth within which interference is expected to be present in the received simulated interferer signal.

10. A system comprising:
a computing device, wherein the computing device comprises at least one processor and at least one memory, wherein the at least one processor is configured to execute program instructions stored in the at least one memory so as to carry out operations, the operations comprising:
causing a radar unit to transmit radar signals in an environment of a vehicle,
wherein the radar unit is coupled to the vehicle,
wherein the computing device comprises a model trained based on a labeled interferer dataset that represents a plurality of interferer signals generated by a digital radio frequency memory (DRFM) device located remote from the vehicle, wherein the DRFM device generates the plurality of interferer signals based on sets of transmission patterns randomly selected from one or more radar signal parameter models, wherein labels are automatically applied to the plurality of interferer signals to generate the labeled interferer data set after a removal of one or more spurious artifacts from the plurality of interferer signals, and wherein the one or more spurious artifacts are produced by the DRFM device during generation of the plurality of interferer signals;
receiving, from the radar unit, electromagnetic energy from the environment;
based on the model, determining whether the received electromagnetic energy corresponds to the transmitted radar signals or an interferer signal;
based on determining that the electromagnetic energy corresponds to the transmitted radar signals, generating a representation of the environment of the vehicle using the electromagnetic energy
receiving, from a remote computing system, a second model, wherein the second model is trained based on the labeled interferer data set after a plurality of modifications to the labeled interferer data set; and
subsequently using the second model to determine whether received electromagnetic energy corresponds to transmitted radar signals or one or more interferer signals.

11. The system of claim 10, wherein determining whether the electromagnetic energy corresponds to the transmitted radar signals or the interferer signal comprises:
applying a filter to the electromagnetic energy to remove a first portion of the electromagnetic energy corresponding to one or more interferer signals, wherein the filter depends on the model; and
wherein generating the representation of the environment of the vehicle using the electromagnetic energy comprises:
generating the representation of the environment of the vehicle using a second portion of the electromagnetic energy.

12. The system of claim 10, the operations further comprising:
training machine learning software using the labeled interferer dataset; and
generating the model via the trained machine learning software.

13. The system of claim 10, wherein labels for each interferer signal from the plurality of interferer signals depends on the transmission parameters used by the DRFM device to transmit the interferer signal.

14. The system of claim 10, wherein the one or more spurious artifacts includes local oscillator bleed.

15. The system of claim 10, wherein the removal of the one or more spurious artifacts comprises an addition of noise at a spectral region of a received simulated interferer signal that includes a given spurious artifact.

16. A vehicle system comprising:
a receiver configured to receive radio frequency signals from an environment of a vehicle; and
a computing device, coupled to the receiver, configured to determine whether a radio frequency signal received by the receiver is one of: a reflection of a radar signal transmitted from a radar unit of the vehicle or a radio frequency signal from an emitter in the environment of the vehicle, based on a model trained on a labeled interferer dataset generated using one or more DRFM devices remote from the vehicle,
wherein each DRFM device generates a plurality of interferer signals based on sets of transmission patterns randomly selected from one or more radar signal parameter models, wherein labels are automatically applied to the plurality of interferer signals to generate the labeled interferer data set after a removal of one or more spurious artifacts from the plurality of interferer signals, wherein the one or more spurious artifacts are produced by the one or more DRFM devices during generation of the plurality of interferer signals,
wherein the computing device is further configured to receive, from a remote computing system, and subsequently use a second model to determine whether received electromagnetic energy corresponds to transmitted radar signals or one or more interferer signals, and wherein the second model is trained based on the labeled interferer data set after a plurality of modifications to the labeled interferer data set.

17. The method of claim 1, wherein one or more labels applied to the plurality of interferer signals identify a manufacturer and a model of a vehicle associated with generating radar signals matching one or more interferer signals.

18. The method of claim 1, wherein receiving the second model comprises:
receiving the second model via an over-the-air update.

19. The method of claim 1, wherein the DRFM device is located in a radar test chamber, and
   wherein the one or more radar signal parameter models convey bandwidth, center frequency, pulse width, ramp rate, gap between pulses, pulse rate, waveform, and hold off time for use when generating an interferer signal.

* * * * *